United States Patent [19]

Cannon et al.

[11] 4,133,561

[45] Jan. 9, 1979

[54] HOSE COUPLING

[75] Inventors: John G. Cannon, Penn Hills; Daniel G. Scott, Wilkinsburg; William K. Mong, North Huntingdon, all of Pa.

[73] Assignee: Westinghouse Air Brake Company, Wilmerding, Pa.

[21] Appl. No.: 793,665

[22] Filed: May 4, 1977

[51] Int. Cl.² .................... F16L 35/00; B60D 1/08
[52] U.S. Cl. ......................................................... 285/68
[58] Field of Search ......................... 285/68, 69, 74, 65

[56] References Cited

U.S. PATENT DOCUMENTS

| | | | |
|---|---|---|---|
| 1,059,319 | 4/1913 | Schuyler | 285/68 |
| 1,313,225 | 8/1919 | Gootee | 285/69 X |

*Primary Examiner*—Thomas F. Callaghan
*Attorney, Agent, or Firm*—R. S. Visk; R. W. McIntire, Jr.

[57] ABSTRACT

An improved hose coupling for railway vehicle brake pipe hoses, which coupling is characterized by a straight nipple portion and an angular extension of the lower end of the coupling lip for preventing inadvertent uncoupling due to excessive bouncing motion of the vehicle and, therefore, vertical oscillation of the hoses.

1 Claim, 4 Drawing Figures

HOSE COUPLING

BACKGROUND OF THE INVENTION

Present railway car hose couplings are designed with the nipple portion formed at a 15° angle relative to the body of the coupling so that when the brake hose of two adjoining cars are connected, the hoses hang or sag at a predetermined angle below the level of the brake pipe on the car. As is known to those familiar with railway hose couplings, the sagging dispostion of the hoses maintain the coupled connection. In order to uncouple the hoses, the couplings must be oppositely rotated relative to each other by raising the hoses, at the point of coupling, above the level of the car brake pipe. In so doing, the couplings are consequently rotated relative to each other sufficiently to be disengaged. While the cars are in motion, there may be sufficient bouncing to cause the hoses themselves to be oscillated to such an extent as to result in inadvertent uncoupling of the hoses and consequently an undesirable or inadvertent emergency brake application.

In order to prevent unintentional uncoupling, locking type hose couplings have been proposed, that is, providing the couplings with a latching mechanism requiring preliminary unlatching operation before uncoupling can be effected. Such arrangements, however, have proven to be cumbersome in operating, susceptible to freezing, and considerably more expensive to manufacture.

SUMMARY OF THE INVENTION

The object of the present invention is to provide an improved hose coupling that is less susceptible to inadvertent uncoupling due to oscillation without resorting to positive locking devices and without adversely affecting facility of manual uncoupling thereof.

The object of the invention is accomplished by providing a hose coupling having a nipple portion axially aligned with the body as opposed to being disposed at an angle, such as 15°, relative thereto. The axially aligned nipple portion offers more resistance to rotation of the coupling in the uncoupling direction. Moreover, the lower extremity or that end of the arcuate lip of the coupling closer to the track bed when the hoses are coupled, has been angularly increased or extended to thereby necessitate a greater amount of relative rotation between the coupling bodies when uncoupling the connected hoses. Thus, inadvertent uncoupling due to bouncing or oscillation of the hoses is appreciably lessened by virtue of the axially aligned nipple and the angular extension of the lip.

DESCRIPTION AND OPERATION

Figure 1:
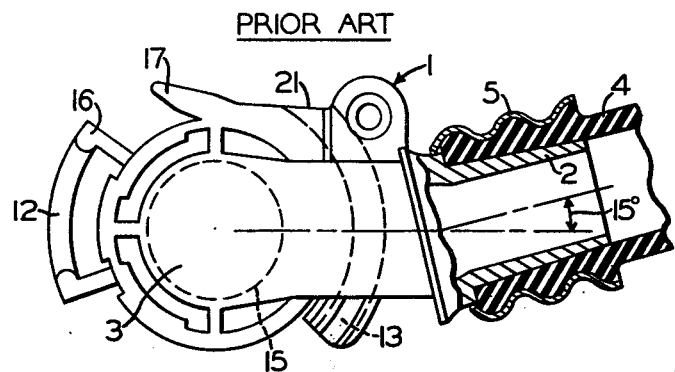
FIG. 1 is an elevational view, partly in section and partly in outline, of a presently known railway car brake hose coupling labeled PRIOR ART.

As shown in FIG. 1, a railway car brake pipe hose coupling 1 is provided with a nipple portion 2 offset at an angular disposition relative to a hollow body portion 3 through which fluid pressure may flow to or from said nipple portion. The offsetting angle of nipple portion 2 relative to body portion 3 in a standard or conventional coupling may be, for example, 15° as indicated in FIG. 1.

Figure 4:
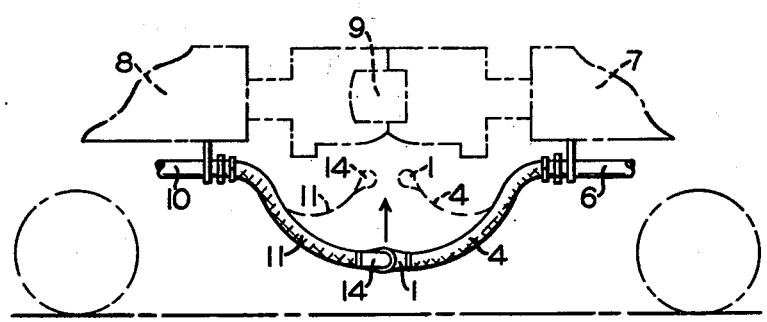
FIG. 4 is a schematic view showing a pair of brake hoses in coupled disposition.

A brake pipe hose 4 has one end sealingly secured by a clamp 5 to nipple 2, the other end of said hose, as may be seen in FIG. 4 being connected to an end of a brake pipe 6 extending the length of a railway car 7 only a fragmentary portion of which is shown in broken outline in FIG. 4. Also shown is a portion of an adjoining railway car 8 coupled to car 7 by a coupler 9 and similarly equipped, as car 7, with a brake pipe 10 and a brake pipe hose 11 shown in coupled relation with hose 4 of car 7.

Hose coupling 1 is also provided with a conventional arcuately shaped lip 12 at the peripheral edge of body portion 3 axially opposite nipple 2. The purpose of lip 12, as is known to those skilled in the art, is to rotatably engage a complementary arcuate groove or channel (designated 13 on hose coupling 1) of predetermined arcuate length formed on body portion 3 of a counterpart hose coupling 14 adjacent nipple portion 2, while a similar lip formed on the counterpart coupling engages the groove 13 formed on coupling 1 for holding the hose couplings in a mated relationship, as shown in FIG. 4. Lip 12 and groove 13 are disposed peripherally on diametrally opposite sides of and in concentric relation to a circular opening 15 (shown in broken outline in FIGS. 1, 2, and 3) in body portion 3 and at opposite ends of a diameter passing through said opening and coinciding with the axis of the coupling.

Two brake pipe hoses on adjacent coupled cars, such as hoses 4 and 11 on cars 7 and 8 for example, may be coupled in a well-known manner by raising the respective ends of the hoses, as indicated by the arrow and phantom representation of the hoses in FIG. 4, bring the hose couplings 1 and 14 together to engage the lips thereof in the counterpart grooves. respectively, then allowing the hoses to drop by their own weight. As the hoses drop to a normal hanging position as shown in FIG. 4, the two couplings 1 and 14 rotate relative to each other until a coupled relation or position is attained, such relative rotation, and therefore said coupled position, being limited by abutting contact of an upper extremity or end 16 of the lip 12 of one coupling with a stop member or modular protrusion (designated 17 on coupling 1) formed laterally on the upper side, as viewed in FIGS. 1, 2, and 3, of body portion 3 of the hose couplings 1 and 14. The stops 17 are so located as to engage the ends 16 of lips 12 of couplings 1 and 14, respectively, when the couplings have attained the appropriate coupled position, that is, a substantially axially aligned position, as shown in FIG. 4.

In order to uncouple hoses 4 and 11, the hoses must again be raised, as indicated by the arrow in FIG. 4, for effecting counter-rotation between hose couplings 1 and 14 until the lips 12 are clear of the respective grooves 13 so that the couplings may be separated from each other and uncoupled.

As was hereinbefore noted, when the cars 7 and 8 are in motion, there may be such bouncing of the cars to cause the coupled hoses 4 and 11 to be bounced high enough to cause inadvertent uncoupling thereof.

Hose coupling 1, as shown in FIG. 1, represents the present standard coupling as approved by the Association of American Railroads (AAR). A hose coupling 18, as shown in FIGS. 2 and 3 and according to the invention, differs from hose coupling 1, in that the nipple portion 2 is axially aligned with the body portion 3, and that portion of a lip 19 below the centerline of the coupling is of greater angular dimension that the corresponding lip portion of hose coupling 1.

Figure 2:
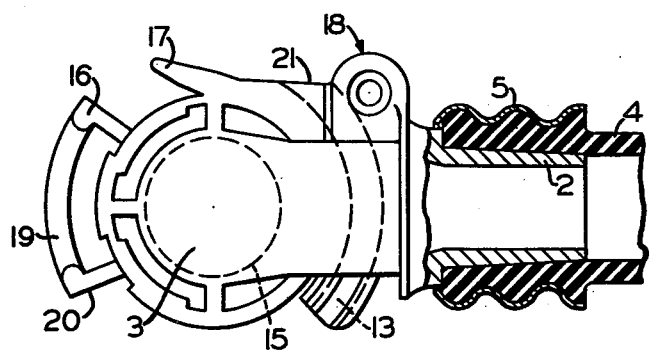
FIG. 2 is an elevational view, partly in outline and partly in section, of an improved railway car brake hose coupling embodying the invention.
Figure 3:
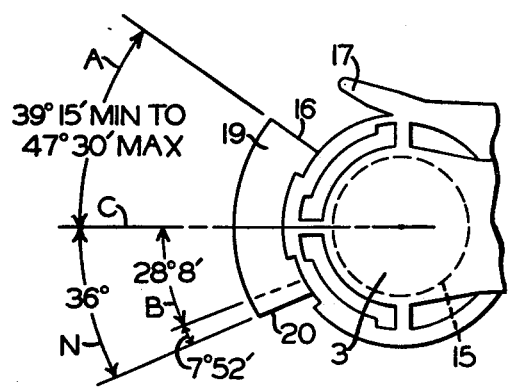
FIG. 3 is a fragmentary view, in outline, of a railway car brake hose coupling showing specific details of the coupling improvements.

By referring to FIG. 3, a comparison of the angular dimensions of lip 12 of the standard hose coupling 1 may be made with the new angular dimensions of lip 19 of the improved hose coupling 18 shown in FIG. 2. An upper portion of either lip 12 or 19 disposed above the axis or a centerline C of the respective hose couplings, according to AAR standards, may range from a minimum of 39° 15' to a maximum of 47° 30'. This dimension, which is not critical to the invention, is designated as A in FIG. 3 of the drawing. The angular dimension of a lower portion of lip 12 disposed below centerline C of hose coupling 1, according to present AAR standards, is presently 28° 8', which dimension is designated B in FIG. 3 of the drawing. Since dimension B, as will become evident hereinafter, is the critical dimension to the invention, said dimension B has been increased from 28° 8' to a new dimension of 36°, or an incremental increase of 7° 52' in new hose coupling 18, said new dimension of 36° being designated by the letter N in FIG. 3.

When the improved hose coupling 18 is employed, by having the nipple portion 2 in axial alignment with body portion 3, that portion of hose 4, for example (which, as is well known, has a certain degree of flexibility) adjacent and connected to said nipple portion, is distorted into a horizontal disposition, rather than an upwardly angled disposition when connected to hose coupling 1. This horizontal disposition of hose 4 adjacent nipple portion 2 of hose coupling 18 offers greater resistance to upward bending of the hose, either intentional or unintentional, and, therefore, reduces the possibility of inadvertent uncoupling due to excessive bouncing.

Moreover, by extending dimension B of the lower portion of lip 19 below the coupling centerline C approximately 8° to dimension N, or 36°, a greater amount of counter-rotation between two hose couplings similar to coupling 18, when uncoupling, is required before lower radial ends or edges 20 of the lips 19 rotatably clear upper radial ends 21 (see FIG. 2) of upper portions of grooves 13 disposed on the upper side of centerline C of the counterport hose couplings, respectively, to permit separation thereof. Becuase of this additional amount of counter-rotation required before separation of the couplings can be effected, the coupled hoses 4 and 11 must be raised to a higher level than presently required in order to effect uncoupling thereof.

It is evident, therefore, that the axially aligned nipple portion 2 combined with the angular increased dimension of the lower portion of lip 19 of the improved hose coupling 18 makes inadvertent uncoupling of adjacent coupled brake hoses less likely.

Having now described the invention, what we claim as new and desire to secure by Letters Patent, is:

1. An improved brake hose coupling for use with a railway vehicle brake hose to be coupled with a counterpart hose coupling of a counterpart brake hose of an adjacent vehicle, each of said hose couplings comprising:
   (a) a hollow body portion having an opening therein for registering with a complementary opening in the counterpart hose coupling;
   (b) a nipple portion joined to said body portion in axially aligned relationship thereto and communicable with said opening through the hollow body portion;
   (c) said body portion having an arcuate groove formed thereon between said opening and said nipple portion, peripherally adjacent and in concentric relation to said opening, and transversely to the axis of the coupling, said axis dividing said groove into an upper portion and a lower portion disposed on opposite sides thereof;
   (d) an arcuate lip portion formed on said body portion peripherally adjacent and in concentric relation to said opening, diametrally opposite said arcuate groove, and transversely to the axis of the coupling for rotatably engaging the arcuate groove of the counterpart hose coupling, and vice versa, for retaining the two hose couplings in coupled relationship upon a certain amount of relative rotation in one direction therebetween, said axis dividing said lip portion into upper and lower portions disposed on opposite sides thereof; and
   (e) stop means formed on said body portion for limiting said relative rotation to said certain amount in said one direction,
   (f) said hose couplings being operable, upon said certain amount of relative rotation in a direction opposite to said one direction to an uncoupled disposition in which said lip portions rotatably disengage said grooves, respectively,
   (g) the angular dimension of the upper portion of said lip portion being up to a maximum of 47° 30', and the angular dimension of the lower portion of said lip portion being at least 36°.

* * * * *